United States Patent
Yi et al.

(10) Patent No.: US 10,547,377 B2
(45) Date of Patent: Jan. 28, 2020

(54) METHOD FOR HANDLING AN ID COLLISION FOR D2D COMMUNICATION SYSTEM AND DEVICE THEREFOR

(71) Applicant: LG Electronics Inc., Seoul (KR)

(72) Inventors: Seungjune Yi, Seoul (KR); Youngdae Lee, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 15/115,015

(22) PCT Filed: Jan. 21, 2015

(86) PCT No.: PCT/KR2015/000626
§ 371 (c)(1),
(2) Date: Jul. 28, 2016

(87) PCT Pub. No.: WO2015/115748
PCT Pub. Date: Aug. 6, 2015

(65) Prior Publication Data
US 2016/0344469 A1 Nov. 24, 2016

Related U.S. Application Data
(60) Provisional application No. 61/934,649, filed on Jan. 31, 2014.

(51) Int. Cl.
*H04B 7/26* (2006.01)
*H04L 29/12* (2006.01)
(Continued)

(52) U.S. Cl.
CPC ......... *H04B 7/2612* (2013.01); *H04L 1/0079* (2013.01); *H04L 61/6022* (2013.01); *H04W 28/06* (2013.01); *H04W 76/14* (2018.02)

(58) Field of Classification Search
None
See application file for complete search history.

(56) References Cited

U.S. PATENT DOCUMENTS

2013/0040677 A1 * 2/2013 Lee .................. H04W 8/26
455/509
2013/0188627 A1 7/2013 Cheong et al.
(Continued)

FOREIGN PATENT DOCUMENTS

JP  2007-311881 A  11/2007
JP  2012-104970 A  5/2012
(Continued)

OTHER PUBLICATIONS

Ericsson: "D2D communication addressing", 3GPP TSG-RAN WG2 #84, R2-134237, Nov. 11-15, 2013.
(Continued)

*Primary Examiner* — Robert C Scheibel
(74) *Attorney, Agent, or Firm* — Dentons US LLP

(57) ABSTRACT

The present invention relates to a wireless communication system. More specifically, the present invention relates to a method and a device for transmitting, to a second UE, a first MAC PDU (Medium Access Control Protocol Data Unit) including a first Identity (ID) of the first UE; receiving, from the second UE, a second MAC PDU including a second ID; checking whether the second ID is same as the first ID or not; generating a third ID of the first UE if the second ID is same as the first ID and transmitting, to the second UE, a third MAC PDU including the third ID of the first UE.

8 Claims, 13 Drawing Sheets

(51) Int. Cl.
*H04L 1/00* (2006.01)
*H04W 28/06* (2009.01)
*H04W 76/14* (2018.01)

(56) References Cited

U.S. PATENT DOCUMENTS

2015/0163689 A1* 6/2015 Lee .................. H04W 76/14
370/328
2016/0192420 A1* 6/2016 Kim .................. H04W 74/00
370/329

FOREIGN PATENT DOCUMENTS

| WO | 2012/165821 | A1 | 12/2012 |
| WO | 2013163634 | A1 | 10/2013 |

OTHER PUBLICATIONS

Intel Corporation: "MAC PDU format for D2D 1:M communication", 3GPP TSG RAN WG2 Meeting #84, R2-134293, Nov. 11-15, 2013.
NEC: "On Layer2 identity for D2D one to many communications", 3GPP TSG-RAN2 Meeting #84, R2-134308, Nov. 11-15, 2013.
ITRI: "Discussion on L2 Identifier for D2D Communication", 3GPP TSG RAN WG2 #84, R2-134022, Nov. 11-15, 2013.
R2-134064: "Open issues for D2D communication," pp. 1-4, 3GPP TSG RAN WG2, Meeting #84, San Fran. Nov. 11-15, 2013.

* cited by examiner

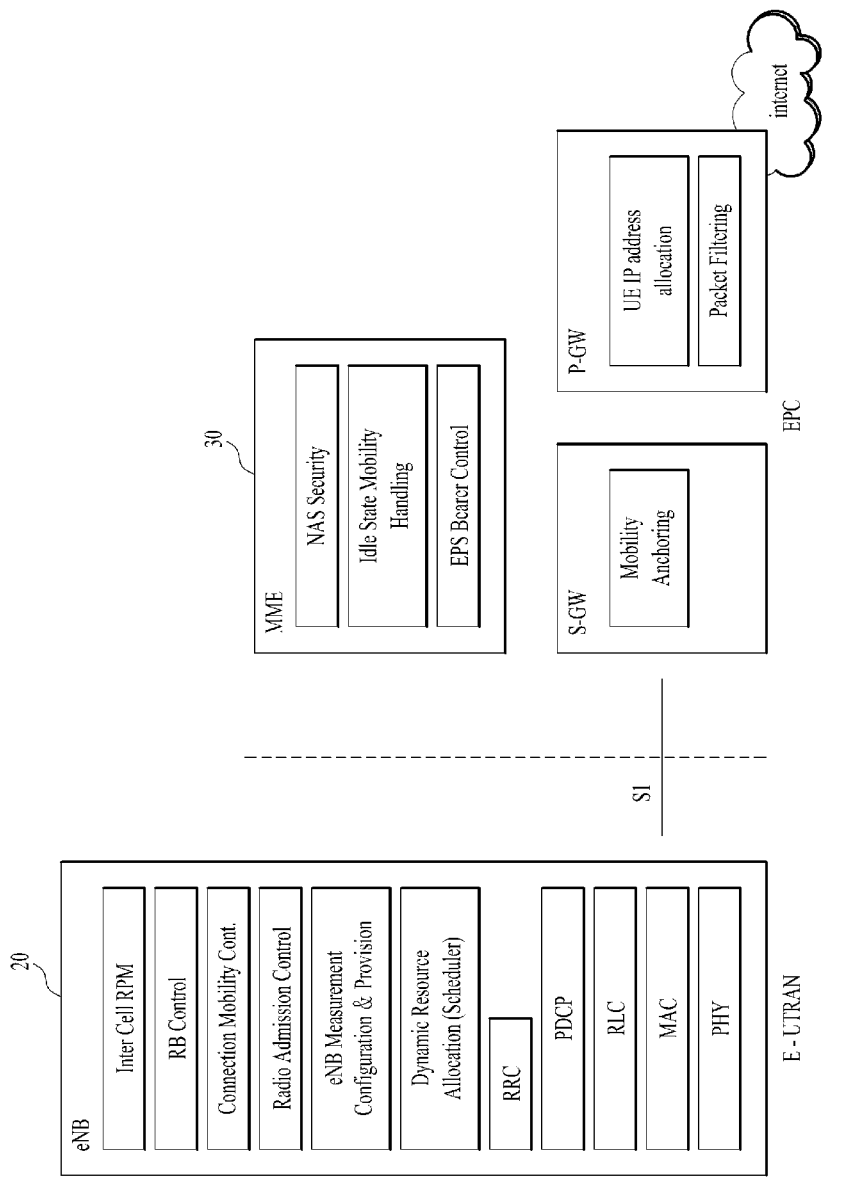

(a) Control-Plane Protocol Stack (b) User-Plane Protocol Stack

R/R/E/LCID/F/L sub-header with
7-bits L field

R/R/E/LCID/F/L sub-header with
15-bits L field

R/R/E/LCID sub-header

METHOD FOR HANDLING AN ID COLLISION FOR D2D COMMUNICATION SYSTEM AND DEVICE THEREFOR

This application is a 35 USC § 371 National Stage entry of International Application No. PCT/KR2015/000626 filed on Jan. 21, 2015, and claims priority to U.S. Provisional Application No. 61/934,649 filed Jan. 31, 2014, all of which are hereby incorporated by reference in their entireties as if fully set forth herein.

TECHNICAL FIELD

The present invention relates to a wireless communication system and, more particularly, to a method for handling an identity collision for D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers another user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE

Technical Problem

An object of the present invention devised to solve the problem lies in a method and device for handling an ID collision for D2D communication system. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: transmitting, to a second UE, a first MAC PDU (Medium Access Control Protocol Data Unit) including a first Identity (ID) of the first UE; receiving, from the second UE, a second MAC PDU including a second ID; checking whether the second ID is same as the first ID or not; generating a third ID of the first UE if the second ID is same as the first ID; transmitting, to the second UE, a third MAC PDU including the third ID of the first UE.

In another aspect of the present invention, provided herein is a UE (User Equipment) for performing random access procedure in a wireless communication system, the UE comprising: an RF (Radio Frequency) module; and a processor configured to control the RF module, wherein the processor is configured to transmit, to a second UE, a first MAC PDU (Medium Access Control Protocol Data Unit) including a first Identity (ID) of the first UE, to receive, from the second UE, a second MAC PDU including a second ID, to check whether the second ID is same as the first ID or not, to generate a third ID of the first UE if the second ID is same as the first ID, and to transmit, to the second UE, a third MAC PDU including the third ID of the first UE.

Meanwhile, In another aspect of the present invention, provided herein is a method for a User Equipment (UE) operating in a wireless communication system, the method comprising: receiving a first MAC PDU (Medium Access Control Protocol Data Unit) including a first identity (ID) from a first UE; generating a second MAC PDU including the first ID if processing related to the first MAC PDU fails; and transmitting the second MAC PDU to the first UE.

In another aspect of the present invention, provided herein is a UE (User Equipment) for performing random access procedure in a wireless communication system, the UE comprising: an RF (Radio Frequency) module; and a processor configured to control the RF module, wherein the processor is configured to receive a first MAC PDU (Medium Access Control Protocol Data Unit) including a first identity (ID) from a first UE, to generate a second MAC PDU including the first ID if processing related to the first MAC PDU fails, and to transmit the second MAC PDU to the first UE.

Preferably, the third ID is different from the first ID.

Preferably, the first ID, the second ID and third ID are IDs of UE used in an MAC entity.

Preferably, the second MAC PDU includes an indicator indicating whether the second ID is included in the second MAC PDU or not, wherein the indicator is a value of an LCID (Logical channel ID) field, wherein the value of an LCID field is allocated to an indication to change the first ID to an ID different from the first ID if the second ID is same as the first ID.

Preferably, the method further comprises: discarding the first ID if the second ID is same as the first ID.

Preferably, failure of the processing related to the first MAC PDU occurs if deciphering failure occurs for pre-defined consecutive number of PDCP (Packet Data Convergence Protocol) PDUs, deciphering failure occurs for pre-defined number of PDCP PDUs within a pre-defined time interval, deciphering failure occurs for all PDCP PDUs within a pre-defined time interval, header decompression failure occurs for pre-defined consecutive number of PDCP PDUs, header decompression failure occurs for pre-defined number of PDCP PDUs within a pre-defined time interval, or header decompression failure occurs for all PDCP PDUs within a pre-defined time interval.

It is to be understood that both the foregoing general description and the following detailed description of the present invention are exemplary and explanatory and are intended to provide further explanation of the invention as claimed.

Advantageous Effects

According to the present invention, D2D ID collision can be efficiently handled in D2D communication system. It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
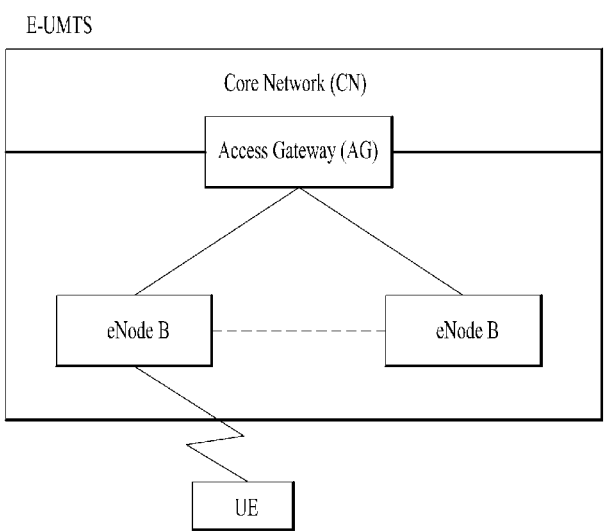
FIG. 1 is a diagram showing a network structure of an Evolved Universal Mobile Telecommunications System (E-UMTS) as an example of a wireless communication system.
Figure 2A:
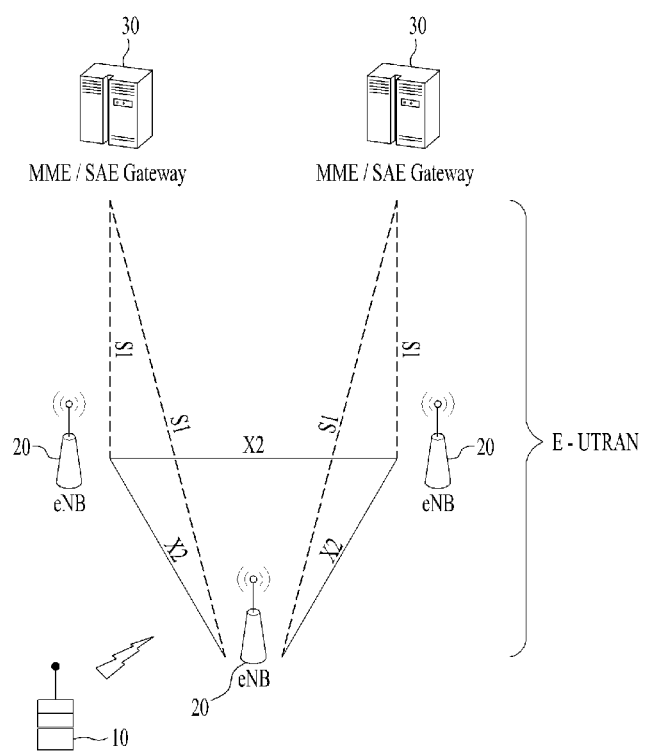
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
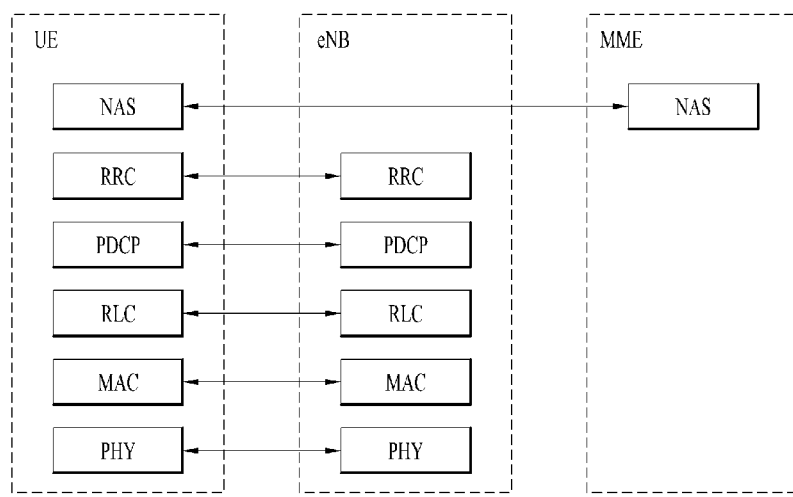
FIG. 3 is a diagram showing a control plane and a user plane of a radio interface protocol between a UE and an E-UTRAN based on a 3rd generation partnership project (3GPP) radio access network standard.
Figure 3:
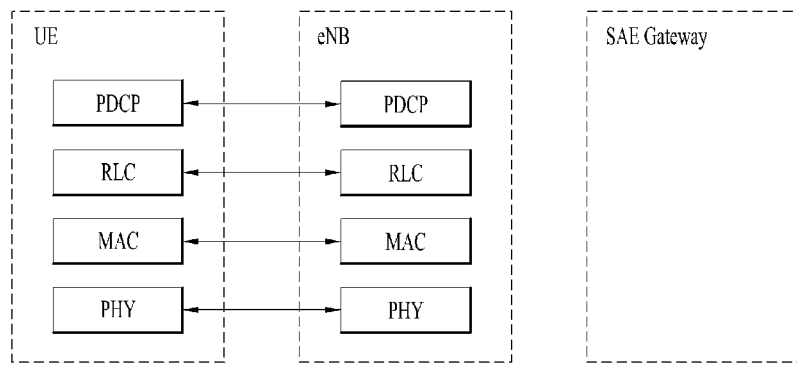

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
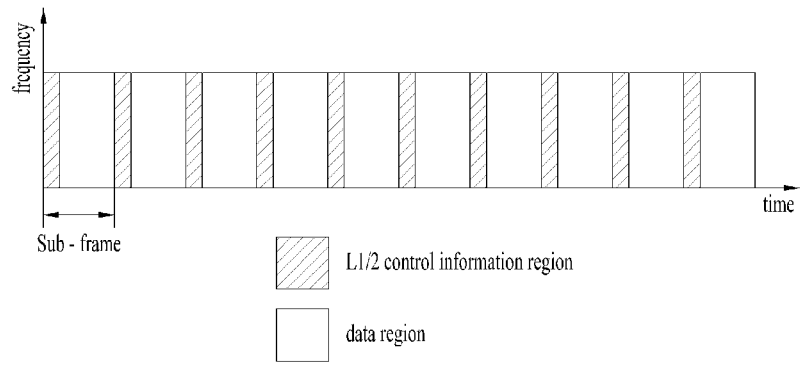
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
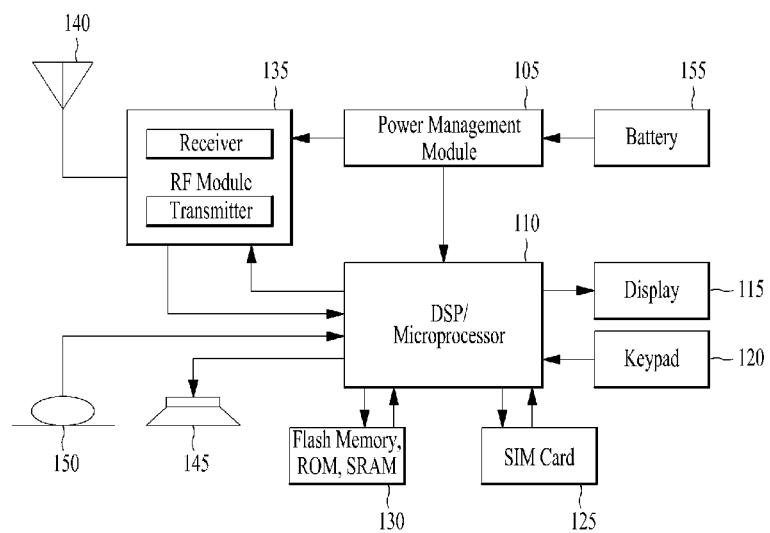
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
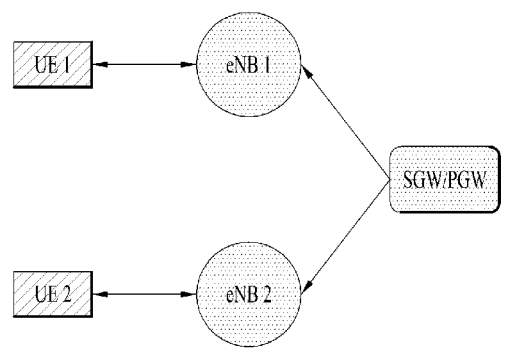
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
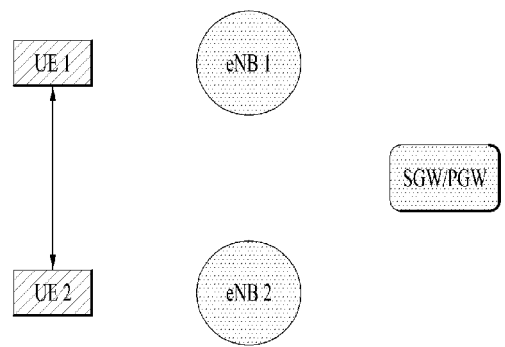
FIGS. 7-8 are examples of data path scenarios for a proximity communication.
Figure 8:
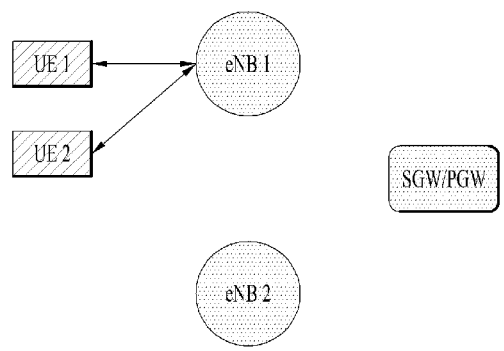

FIGS. 7-8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
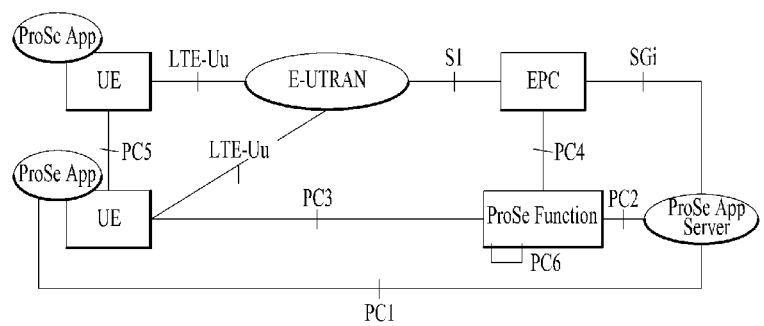
FIG. 9 is a conceptual diagram illustrating for a non-roaming reference architecture.

FIG. 9 is a conceptual diagram illustrating for a non-roaming reference architecture.

PC1~PC 5 represents interfaces. PC1 is a reference point between a ProSe application in a UE and a ProSe App server. It is used to define application level signalling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE. The functionality may include but not restricted to e.g.:

Interworking via a reference point towards the 3rd party Applications

Authorization and configuration of the UE for discovery and Direct communication Enable the functionality of the EPC level ProSe discovery ProSe related new subscriber data and/handling of data storage; also handling of ProSe identities;

Security related functionality

Provide Control towards the EPC for policy related functionality

Provide functionality for charging (via or outside of EPC, e.g. offline charging)

Figure 10:
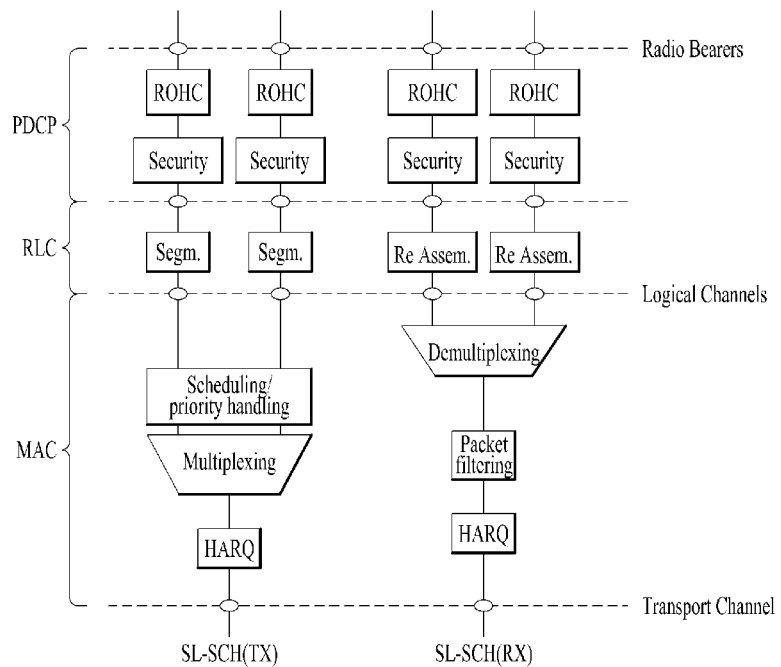
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink.

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

Figure 11A:
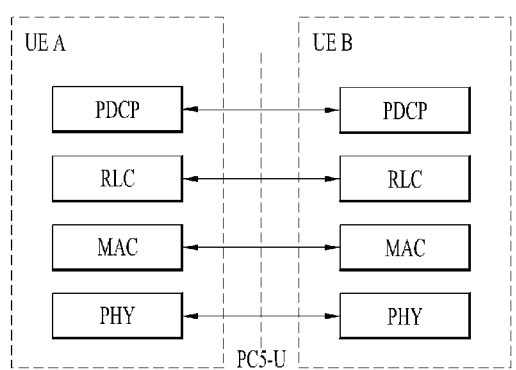
FIG. 11a is a conceptual diagram illustrating for User-Plane protocol stack for ProSe Direct Communication.
Figure 11B:
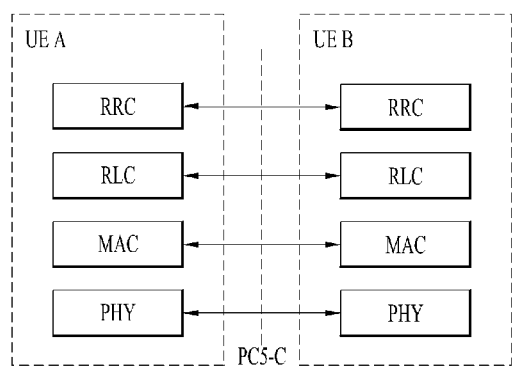
FIG. 11b is Control-Plane protocol stack for ProSe Direct Communication.

FIG. 11a is a conceptual diagram illustrating for User-Plane protocol stack for ProSe Direct Communication, and FIG. 11b is Control-Plane protocol stack for ProSe Direct Communication.

ProSe Direct Communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe Direct Communication.

In order to perform synchronization SBCCH carries the most essential system information needed to receive other ProSe channels and signals. The SBCCH along with synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH; otherwise UE uses pre-configured parameters. There is only one subframe every 40 ms for synchronization signal and SBCCH transmission for in-coverage operation. SIB 18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs Prose Direct communication on subframes defined over the duration of Sidelink Control period. The Sidelink Control period is the period over which resources allocated in a cell for Sidelink Control and Sidelink Data transmissions occur. Within the Sidelink Control period the UE sends a Sidelink Control followed by data. Sidelink Control indicates a Layer 1 ID and characteristics of the transmissions (e.g. MCS, location of the resource(s) over the duration of Sidelink Control period, timing alignment).

The UE performs transmission and reception of Uu and PC5 with the following decreasing priority order:
Uu transmission/reception (highest priority);
PC5 ProSe Direct Communication transmission/reception;
PC5 ProSe Direct Discovery transmission/reception (lowest priority).

Figure 12:
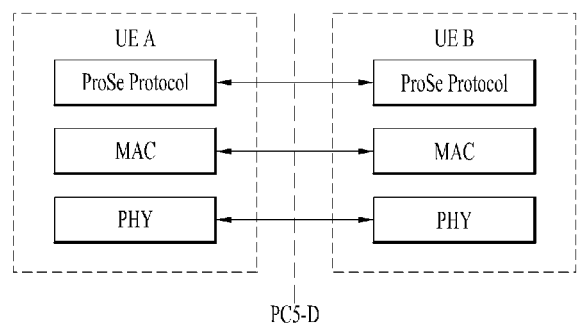
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the UE supporting Direct Discovery to discover other UE(s) in its proximity, using E-UTRA direct radio signals via PC5. ProSe Direct Discovery is supported only when the UE is served by E-UTRAN.

Upper layer handles authorization for announcement and monitoring of discovery message. Content of discovery message is transparent to Access Stratum (AS) and no distinction in AS is made for ProSe Direct Discovery models and types of ProSe Direct Discovery.

The UE can participate in announcing and monitoring of discovery message in both RRC_IDLE and RRC_CONNECTED states as per eNB configuration. The UE announces and monitors its discovery message subject to the half-duplex constraint.

The UE that participates in announcing and monitoring of discovery messages maintains the current UTC time. The UE that participates in announcing transmits the discovery message which is generated by the ProSe Protocol taking into account the UTC time upon transmission of the discovery message. In the monitoring UE the ProSe Protocol provides the message to be verified together with the UTC time upon reception of the message to the ProSe Function.

There are three range classes. Upper layer authorization provides applicable range class of the UE. Maximum allowed transmission power for each range class is signaled in SIB 19. The UE uses the applicable maximum allowed transmission power corresponding to its authorized range class. This puts an upper limit on the determined transmit power based on open loop power control parameters.

Figure 13A:
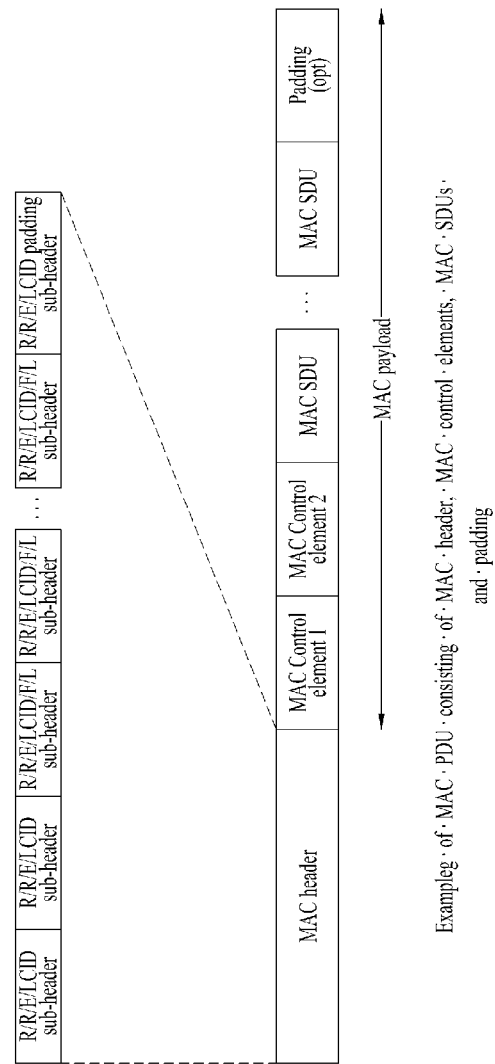
FIG. 13a~FIG. 13c are conceptual diagrams illustrating for a MAC PDU structure.
Figure 13B:
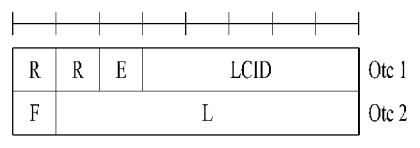
Figure 13B:
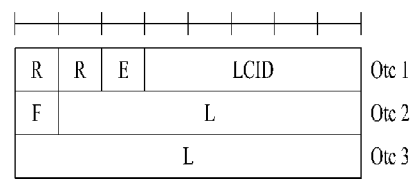
Figure 13C:
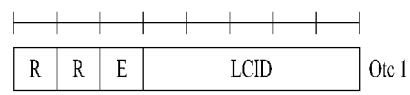

FIG. 13a~FIG. 13c are conceptual diagrams illustrating for a MAC PDU structure.

A MAC PDU consists of a MAC header, zero or more MAC Service Data Units (MAC SDU), zero, or more MAC control elements, and optionally padding; as described in FIG. 13a. Both the MAC header and the MAC SDUs are of variable sizes.

A MAC PDU header consists of one or more MAC PDU subheaders; each subheader corresponds to either a MAC SDU, a MAC control element or padding.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per TB per UE. A maximum of one MCH MAC PDU can be transmitted per TTI.

The MAC header is of variable size and consists of the following fields:

1) LCID: The Logical Channel ID field identifies the logical channel instance of the corresponding MAC SDU or the type of the corresponding MAC control element or padding as described in Tables 1, Table 2 and Table 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits.

TABLE 1

Values of LCID for DL-SCH

| Index | LCID values |
|---|---|
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

TABLE 2

Values of LCID for UL-SCH

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 3

Values of LCID for MCH

| Index | LCID values |
| --- | --- |
| 00000 | MCCH (see note) |
| 00001-11100 | MTCH |
| 11101 | Reserved |
| 11110 | MCH Scheduling Information |
| 11111 | Padding |

NOTE:
If there is no MCCH on MCH, an MTCH could use this value.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

Values of F field

| Index | Size of Length field (in bits) |
| --- | --- |
| 0 | 7 |
| 1 | 15 |

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

In the legacy system, the Logical Channel ID (LCID) is used to identify the logical channel instance of the corresponding MAC SDU or the type of the corresponding MAC control element or padding. There is one LCID field for each MAC SDU, MAC control element or padding included in the MAC PDU. The Logical Channel ID is allocated for each logical channel when the Radio Bearer is setup. Currently, there are 8 values available for data radio bearer (3 to 10).

Figure 14:
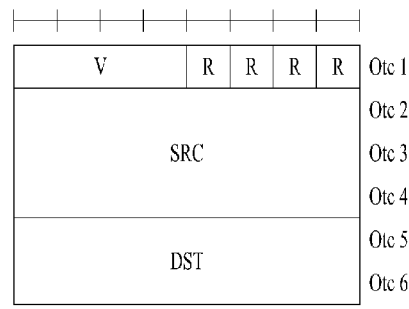
FIG. 14 is an example of MAC PDU structures according to embodiments of the present invention.

FIG. 14 is examples of MAC PDU structures including a source ID and a target ID for D2D communication according to embodiments of the present invention.

FIG. 14 illustrates a case of a MAC subheader including a source ID and a target ID for D2D communication according to embodiments of the present invention. The MAC subheader in FIG. 14 consists of the seven header fields V/R/R/R/R/SRC/DST. The MAC header is of variable size and consists of the following fields: i) 'V' is a MAC PDU format version number field indicates which version of the SL-SCH subheader is used. In this version of the specification only one format version is defined, and this field shall therefore be set to "0001". The V field size is 4 bits, ii) 'SRC' is the source ID (or Source Layer-2 ID field) carries the identity of the source. It is set to the ProSe UE ID. The SRC field size is 24 bits, iii) 'DST' is a DST field carries the 16 most significant bits of a target ID (or Destination Layer-2 ID). The Destination Layer-2 ID is set to the ProSe Layer-2 Group ID, iv) 'R' is a reserved bit, set to "0".

The source ID (SRC) identifies the sender of the data in sidelink ProSe Direct Communication. The source ID is 24 bits long and is used together with ProSe Layer-2 Group ID and LCID for identification of the RLC UM entity and PDCP entity in the receiver.

The target ID (DST) identifies the target of the data in sidelink ProSe Direct Communication. The target ID is 24 bits long and is split in the MAC layer into two bit strings: i) One bit string is the LSB part (8 bits) of target ID and forwarded to physical layer as Sidelink Control Layer-1 ID. This identifies the target of the intended data in Sidelink Control and is used for filtering of packets at the physical layer. ii) Second bit string is the MSB part (16 bits) of the target ID and is carried within the MAC header. This is used for filtering of packets at the MAC layer.

No Access Stratum signalling is required for group formation and to configure source ID, target ID and Sidelink Control L1 ID in the UE. These identities are either provided by higher layer or derived from identities provided by higher layer. In case of groupcast and broadcast, the ProSe UE ID provided by higher layer is used directly as the source ID and the ProSe Layer-2 Group ID provided by higher layer is used directly as the target ID in the MAC layer.

The source ID can be indicated by a higher layer or generated by a source UE itself. If each UE generates its own D2D-ID by itself before executing D2D communication, the problem is that each generated D2D-ID may be same, in which case the D2D communication would not last. There should be some methods defined for handling D2D-ID collision case.

Figure 15:
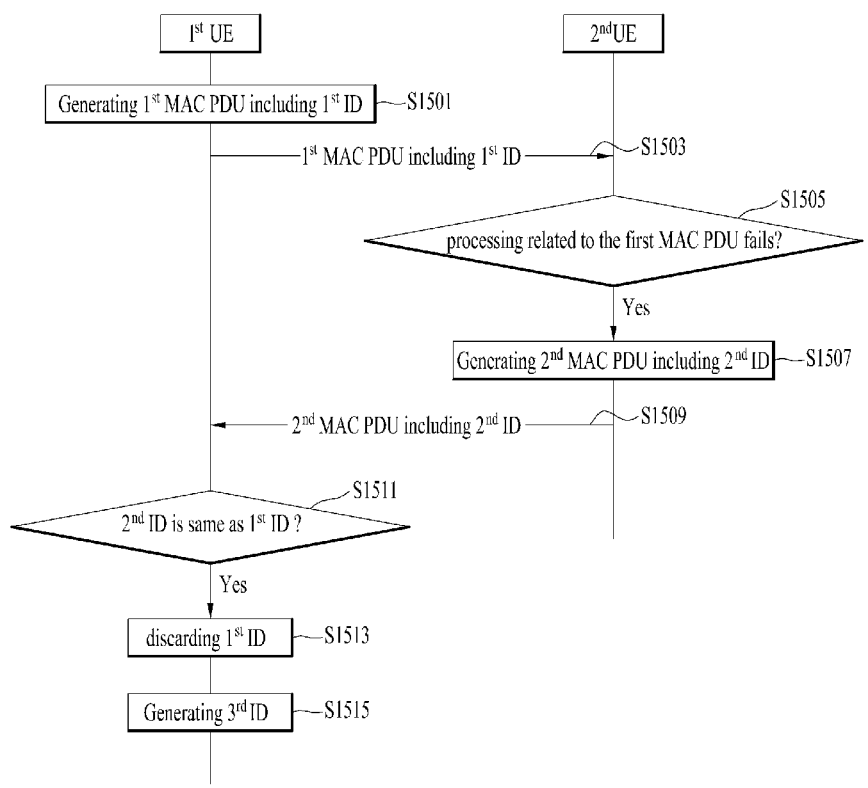
FIG. 15 is a conceptual diagram for handling an ID collision for D2D communication according to embodiments of the present invention.

FIG. 15 is a conceptual diagram for handling an ID collision for D2D communication according to embodiments of the present invention.

If a first UE want to try D2D communication with a second UE directly, a first UE generates a first MAC PDU (Medium Access Control Protocol Data Unit) including a first ID (S1501).

Preferably, the first UE is a source UE (or sender UE) and the second UE is a target UE (or receiver UE).

Preferably, the first ID can be a source ID. The source ID is 24 bits long and is used together with ProSe Layer-2 Group ID and LCID for identification of the RLC UM entity and PDCP entity in the receiver.

Preferably, the first ID is an ID of UE used in an MAC entity.

After the step of S1501, the first UE can transmit the first MAC PDU including the first ID (S1503) to the second UE.

The second UE can receive a plurality of first MAC PDUs from a plurality of first UEs to try D2D communication with the second UE (S1505).

After the step of S1505, the second UE checks whether processing related to the first MAC PDU fails or not.

Figure 16:
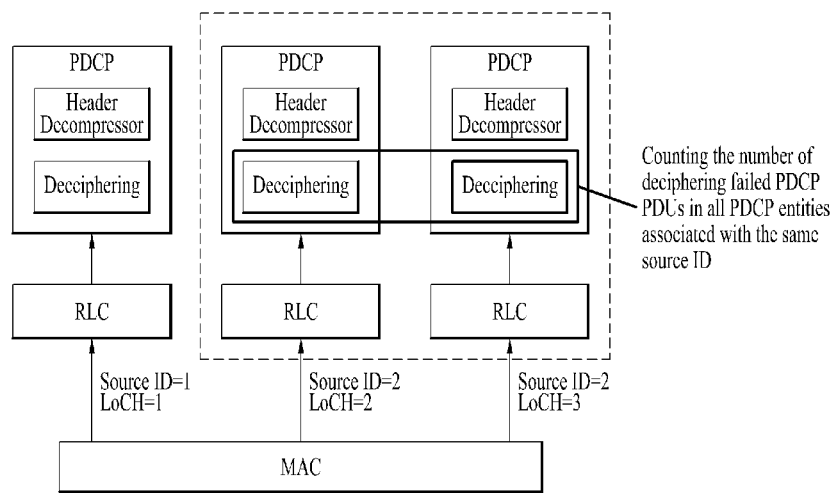
FIG. 16 is an example diagram for detecting an ID collision for D2D communication according to embodiments of the present invention.

FIG. 16 is an example diagram for detecting an ID collision for D2D communication according to embodiments of the present invention.

In step of S1505, the second UE can count the PDCP PDUs included in MAC PDUs addressed by the same first ID (i.e. a source ID of a first UE). The second UE counts the PDCP PDUs in all PDCP entities associated with the same Source ID as shown in FIG. 16. There may be multiple PDCP entities established for the same Source ID. Each PDCP entity is associated with different RLC entities, and each RLC entity is identified by the LCID (Logical Channel ID) included in the MAC PDU. The second UE counts the failed PDCP PDUs regardless of which PDCP entity they belong to if they are associated with the same Source ID.

The second UE consider the failure of the processing related to the first MAC PDU occurs if, Deciphering failure occurs for pre-defined consecutive number of PDCP (Packet Data Convergence Protocol) PDUs;

Deciphering failure occurs for pre-defined number of PDCP PDUs within a pre-defined time interval;

Deciphering failure occurs for all PDCP PDUs within a pre-defined time interval;

Header decompression failure occurs for pre-defined consecutive number of PDCP PDUs;

Header decompression failure occurs for pre-defined number of PDCP PDUs within a pre-defined time interval; or Header decompression failure occurs for all PDCP PDUs within a pre-defined time interval.

Preferably, the pre-defined consecutive number can be signaled by a BS when the second UE is connected to the BS.

Preferably, the pre-defined consecutive number can be specified in the specification.

Preferably, the pre-defined time interval can be signaled by a BS when the second UE is connected to the BS.

Preferably, the pre-defined time interval can be specified in the specification.

Preferably, the PDCP PDUs not including PDCP SDUs (i.e. PDCP Control PDU) are not counted.

When the second UE detects that a first ID collision occurs for at least two first UEs, the second UE indicates the collided ID to the first UEs.

The second UE can generate a second MAC PDU including the collided ID if processing related to the first MAC PDU fails (S1507) and transmit the second MAC PDU to the first UE (S1509).

Preferably, the second MAC PDU includes an indicator indicating whether the collided ID is included in the second MAC PDU or not.

Preferably, the indicator can be a value of an LCID (Logical channel ID) field.

Preferably, the value of an LCID field can be allocated to an indication of ID collision. The value of an LCID field can be allocated to an indication to change the first ID to an ID different from the first ID if the second ID is same as the first ID.

Preferably, the collided ID is an ID used in an MAC entity.

Preferably, the second MAC PDU can include an ID of the second ID.

The first UE can checking whether the collided ID is same as the first ID of the first UE or not when the second MAC PDU is received from the second UE (S1511). The first UE can discard the first ID (S1513) and generate a new ID different from the first ID (S1315) if the collided ID is same as the first ID of the first UE. The first UE can use the newly generated source ID from then on.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for operating a first User Equipment (UE) in a wireless communication system, the method comprising:

receiving, by the first UE, a first Protocol Data Unit (PDU) including a first identifier (ID) from a second UE identified by the first ID;

receiving, by the first UE, a second PDU including a second ID from a third UE identified by the second ID;

determining, by the first UE, whether processing related to the second PDU has failed, wherein the processing related to the second PDU comprises deciphering at least Packet Data Convergence Protocol (PDCP) data unit associated with the second PDU;

generating, by the first UE, a third PDU including the second ID and an indicator, informing the third UE that the second ID has collided with the first ID, when the processing related to the second PDU has failed; and transmitting, by the first UE, the third PDU including the second ID, to the third UE.

2. The method according to claim 1, wherein the first ID and the second ID are layer 2 identifiers used in Medium Access Control (MAC) entities.

3. The method according to claim 1, wherein when the processing related to the second PDU has failed, the UE considers that the second ID has collided during D2D communication with the second UE and the third UE.

4. The method according to claim 3, wherein a failure of the processing related to the second PDU occurs when: a number of deciphering failures for PDCP PDUs associated with the second PDU reaches a pre-defined number, consecutively, a deciphering failure for a pre-defined number of PDCP PDUs related to the second PDU occurs within a pre-defined time interval, a deciphering failure for all PDCP PDUs related to the second PDU occurs within a pre-defined time interval, a number of header decompression failures for PDCP PDUs related to the second PDU reaches a pre-defined number, consecutively, a header decompression failure for a pre-defined number of PDCP PDUs related to the second PDU occurs within a pre-defined time interval, or a header decompression failure for all PDCP PDUs related to the second PDU occurs within a pre-defined time interval.

5. A first User Equipment (UE) operating in a wireless communication system, the first UE comprising:

a transceiver; and a processor, operatively coupled to the transceiver, wherein the processor is configured to:

control the transceiver to receive a first Protocol Data Unit (PDU) including a first identifier (ID) from a second UE identified by the first ID, control the transceiver to receive a second PDU including a second ID from a third UE identified by the second ID, determine whether processing related to the second PDU has failed, wherein the processing related to the second PDU comprises deciphering at least Packet Data Convergence Protocol (PDCP) data unit associated with the second PDU, generate a third PDU including the second ID and an indicator informing the third UE that the second ID has collided with the first ID, when the processing related to the second PDU has failed; and control the transceiver to transmit the third PDU including the second ID, to the third UE.

6. The first UE according to claim 5, wherein the first ID and the second ID are layer 2 identifiers used in Medium Access Control (MAC) entities.

7. The first UE according to claim 5, wherein when the processing related to the second PDU has failed, the UE considers that the second ID has collided during D2D communication with the second UE and the third UE.

8. The first UE according to claim 7, wherein a failure of the processing related to the second PDU occurs when: a number of deciphering failures for PDCP PDUs associated with the second PDU reaches a pre-defined number, consecutively, a deciphering failure for a pre-defined number of PDCP PDUs related to the second PDU occurs within a pre-defined time interval, a deciphering failure for all PDCP PDUs related to the second PDU occurs within a pre-defined time interval, a number of header decompression failures for PDCP PDUs related to the second PDU reaches a pre-defined number, consecutively, a header decompression failure for a pre-defined number of PDCP PDUs related to the second PDU occurs within a pre-defined time interval, or a header decompression failure for all PDCP PDUs related to the second PDU occurs within a pre-defined time interval.

* * * * *